United States Patent
Chutov et al.

(10) Patent No.: US 6,473,695 B1
(45) Date of Patent: Oct. 29, 2002

(54) METHOD FOR DIRECT HYDROCARBON RESERVOIR DETECTION AND DELINEATION BY LOW FREQUENCY ACOUSTIC SPECTROSCOPY

(75) Inventors: Gennadij J. Chutov; Ernst D. Rode, both of Minusio (CH); Juergen Moritz, Heidelberg (DE)

(73) Assignee: ADNR Technology Services GmbH, Minusio (CH)

( * ) Notice: Subject to any disclaimer, the term of this patent is extended or adjusted under 35 U.S.C. 154(b) by 0 days.

(21) Appl. No.: 09/542,492

(22) Filed: Apr. 3, 2000

(30) Foreign Application Priority Data

Apr. 1, 1999 (DE) .......................... 199 15 036

(51) Int. Cl.$^7$ .................................. G01V 3/00
(52) U.S. Cl. .............................. 702/2; 367/30
(58) Field of Search .................. 702/2, 14, 85; 367/46, 30; 364/421

(56) References Cited

U.S. PATENT DOCUMENTS 4,210,968 A * 7/1980 Lindseth ............... 367/46
5,724,241 A * 3/1998 Wood et al. ........... 364/421
5,862,517 A * 1/1999 Honey et al. ............ 702/85

OTHER PUBLICATIONS

Josep Vila, "The Broadband Seismic Station CAD (Túnel del Cadi, Eastern Pyrenees): Site Characteristics and Background Noise",*Bulletin of the Siesmological Society Of America*, vol. 88, No. 1, Feb. 1998, pp. 297–303.

* cited by examiner

*Primary Examiner*—Edward Lefkowitz
*Assistant Examiner*—Anthony Gutierrez
(74) *Attorney, Agent, or Firm*—Pauley Petersen Kinne & Erickson

(57) ABSTRACT

A method for detecting and identifying a type and geometric dimensions of hydrocarbon deposits and other underground fluid deposits. Sensors are used to measure anomalies caused by a deposit in a natural earth frequency spectrum. Different frequencies are filtered out and analyzed, for respective deposits. Amplitudes of maxima are separately evaluated, corresponding to separately measured frequencies. Amplitude values of the maxima are placed into correlation with each other and measuring points are determined.

10 Claims, 5 Drawing Sheets

METHOD FOR DIRECT HYDROCARBON RESERVOIR DETECTION AND DELINEATION BY LOW FREQUENCY ACOUSTIC SPECTROSCOPY

BACKGROUND OF THE INVENTION

1. Field of the Invention

This invention relates to a method for detecting and for identifying the type and the geometric dimensions of hydrocarbon deposits and other underground fluid deposits.

2. Description of Prior Art

Various, mostly incomplete methods, which partially complement each other, are known for finding deposits of raw materials and deposits having other anomalies in the crust of the earth. Historically, the detection of such deposits, in particular oil and gas deposits, occurred by accident. This is also still the case to a large extent today and is extremely unsatisfactory. A system has been developed through the frequency of such discoveries which initially only referred to the geological structure of the earth and its development over time.

BACKGROUND

Methods have been developed which are of a technical nature and make confirmation of hypotheses easier but which are not suitable to make definite statements regarding the existence of deposits and their geographic composition. With the continuation of the development and new technical possibilities, methods are known today which somewhat make locating possible deposits easier. Such methods include infrared photographs taken from satellites, magnetic methods and seismic methods, which can provide information regarding the geologic structure, and partially also regarding the type of the deposits. These methods are of the active type, as well as of the passive type.

The amount of knowledge in regard to searching for hydrocarbon deposits is still very limited, and is basically limited to performing seismic, geologic, geo-physical or geo-chemical explorations, all of which, however, still have a more or less experimental character and do not permit direct statements regarding the type of deposits. Exact statements regarding the type of the deposits can only be made once the deposits are physically detected.

Initially, an exploration by seismic methods is performed for finding hydrocarbon deposits in new regions. During this, a signal is generated by one or several sources, whose reflections at inhomogeneous zones is again received by sensors, including geophones, and whose chronological progress is evaluated for the identification of inhomogeneities, including the use of propagation time measurement. The results of such explorations provide information regarding the presence and the extent of inhomogeneities, but not with respect to their cause. Such explorations can be evaluated using two-dimensional, as well as three-dimensional methods, however, they are not suited for determining the type of the inhomogeneity but only provide information as to its existence, which is important but not sufficient.

Many seismic methods are based on the investigation of longitudinal wavefronts, triggered by one or several sources, such as explosions or mechanical vibrations, and whose simple or multiple reflections at inhomogeneities of the subsurface, including the transport medium of the propagation effect, are evaluated for geometrically identifying them by receiving the returning wavefront by sensors, including geophones, distributed over the terrain. It is possible by displacement of the propagation time and damping between the initial signal and the received signal to draw conclusions regarding the geometric extent also of geologic formations in the measuring zone.

Basically all these methods operate by means of a very broad frequency spectrum, mainly above 30 Hz. Although it is possible by evaluating the reflections to recognize formations as an image of the reflection properties, it is not possible to determine the type of these formations. Therefore such explorations are called indirect.

Only further mechanical explorations, namely the driving of exploration bore holes and the sequential examination of drilling cores, provide information regarding the type of rocks in the formations, wherein the information is not definitive as long as an exploration bore hole has not been sunk exactly into the deposit.

These known methods are very expensive to perform, and their result can be to find that which is not sought. It is known that the rate of success of these methods is far below 40%.

Methods have also been proposed for the identification of raw materials which utilize the resonance of the entire mass of a deposit as an indicator of its existence and also its type.

Here, the effect of the resonance on one or several variable mechanical oscillators, an electrical analogy would be an absorption circuit, is to be utilized. One disadvantage of these known methods is that they are almost impossible to perform technically and the frequency of the resonance to be exited, to the extent that it is based on workable deposits, is strictly a function of the geometric spread of the deposits, and not of their nature. In this case, no characteristic values exist for defined types of deposits.

SUMMARY OF THE INVENTION

It is one object of this invention to provide a method by which it is possible to directly determine the presence and the type of hydrocarbon deposits. In contrast to the known methods, this method provides both a statement regarding the type of the deposit as well as its geographic position and extent.

In general, this method relates to the presence of multiphase fluid systems in porous bodies, and in particular, to the exploration of subterranean hydrocarbon deposits.

The method of this invention provides a direct statement regarding the type and extent of deposits without necessarily first sinking exploration drill holes. It thus saves costs, is ecologically advantageous and is also suitable for monitoring changes in the deposits, which is important for an efficient working of such deposits.

This object is achieved by a method for detecting and for identifying the type and the geometric dimensions of hydrocarbon deposits and other underground fluid deposits, as set forth in this specification and in the claims.

The method proposed by this invention relates to a geometric location and a determination of the type of deposits, or of deposits causing anomalies in the crust of the earth, in particular to the presence of oil, gas, gas condensate, or generally, hydrocarbons. Deposits are understood to be the presence of any kind of significant, in particular economically usable concentrations, but also any arbitrary significantly appearing bodies, which can be demarcated with respect to their surroundings. In contrast to the known methods, the method proposed by this invention provides a statement regarding the type and nature of the deposits, as well as a statement regarding their geographic position and geometric extent. The method of this invention is not an indirect method, wherein conclusions are drawn from secondary events, but a direct method which can provide a statement of a quantitative nature, as well as a qualitative nature.

During examination of deposits having multiphase fluid systems in porous bodies, an effect can be observed, which can be used to determine the type of the deposits and which is the subject of this invention.

A hydrocarbon deposit collected in a collector, a lithological formation suitable for receiving hydrocarbons, is a multiphase system with different interior energy. This system is capable of taking on different energetic states. The transition from one energy state into another is connected with energy absorption or energy release. Energy release always manifests itself by the emission of a frequency characteristic of the fluid system, and therefore of the type and nature of the deposit. This frequency is essentially determined by the composition of the fluid system, by the porosity of the collector, and by the permeability of the collector and does not correspond to the natural frequency of the deposit, which perhaps could be generated by natural vibrations in the mass volume, which for example is not a function of the geometry of the deposit.

Moreover, the effect is not a resonance effect in the sense of a periodically exited resonator, but the energy release with the characteristic frequencies takes place chaotically. The frequency of energy releases is a function of the amount of the energy supplied from the outside. No connection has been observed between the frequency of the energy release and the characteristic frequency emitted, however, a connection has been observed between the frequency of the energy release and the volume of the multiphase system. For hydrocarbon deposits, the emitted characteristic frequency lies in the range between 0.1 and approximately 10 Hz. Thus, the following characteristic frequencies can be observed:

$$F_{oil} \approx 2.3 \text{ Hz}$$
$$F_{gas\ condensate} \approx 2.8 \text{ Hz}$$
$$F_{gas} \approx 3.2 \text{ Hz}$$
$$F_{water} \approx 5.8 \text{ Hz}$$

However, the frequencies are a function of the properties of the respective geomorphologic and hydrostatic/hydrodynamic systems. Inter alia, they are dependent of the porosity, the permeability, the pressure, the temperature and the viscosity.

Excitation takes place by supplying energy, both in the form of thermal energy as well as mechanical energy, caused by the natural tectonic ground noise or by other quasi-mechanical energy sources, for example subterranean pumps.

The so-called ground noise extends in a broad spectrum of mostly longitudinal mechanical waves with a distribution of 1/f, where f=frequency, in the undisturbed case.

The longitudinal waves are propagated through the deposit and can be registered on the surface of the earth in a known manner by sensitive sensors.

While passing through the deposit the longitudinal waves give up a portion of their energy to the deposit, but also pick up a portion of energy in the form of a modulation.

The process of absorption and energy release in fluid systems, which partially represents the transmission medium for the longitudinal waves representing the ground noise, is a non-linear process.

Thus, all waves caused by the earth body and penetrating the deposit undergo a modulation with the characteristic frequency or frequencies of the fluid system.

Here, the characteristic modulation frequencies can occur multiply and next to each other in the spectrum because, depending on the composition of the fluid system, they are different and therefore the respectively dominant frequency changes at different locations at the individual measuring points across a deposit.

The method of this invention uses this effect for identifying hydrocarbon deposits in the ground.

The fact that hydrocarbon deposits always occur in connection with water, and that both media have a characteristic frequency in separate frequency ranges, is essentially used here. For example, hydrocarbons can be observed in the range between 2.0 to 3.5 Hz, a hydrocarbon window, and water in the range between 4.5 and 6.5 Hz, a water window.

The measurement of the anomalies simultaneously in separate frequency ranges, and the correlation of the relative maxima in these frequency ranges with respect to frequency and amplitude is one essential subject of this invention.

Thus, if the two amplitude values of the maxima of the separate frequency ranges are placed into a correlation to each other, it is possible to draw conclusions from this correlation B $$B_i = \frac{AF1_i}{AF2_i}$$

wherein AF1 is an amplitude maximum in the hydrocarbon window and AF2 is an amplitude maximum in the water window, each respectively for the i-th measuring point; and its course over the suspected deposit regarding the extent of the borders of the deposit, which is one object of this invention.

There is a value $B_{min}$, for which $B_i \geq 1$, applies, which determines the borders of the deposit. However, this value $B_{min}$ can only be exactly determined from a correlation of the deposit to be examined with already known deposits and with other geologic and seismic data. But in a first approximation for determining the deposit this is not important, since there is only interest at all in locations for which $B_i$ is at least $\geq 1$.

It is also possible to draw conclusions regarding the type of the deposit from the course of the frequencies of the maxima in the area of the deposit.

In accordance with this invention, one or several three-dimensional operating sensors, such as seismometers, which operate in the frequency range between 0.1 and 20 Hz, are used for detecting these anomalies in the spectrum of the ground noise by measuring techniques.

The signal detected by the sensors over an extended period of time is filtered and subjected to a frequency analysis, and searched for the presence of anomalies.

The detection of these signals by measuring techniques and the recognition of the anomalies requires a great cost outlay in apparatus and mathematics, because the signal to be detected is hidden in the noise spectrum because of its small amplitude, and because the characteristic frequencies are not strictly monochromatic, but distributed over a defined range of the spectrum.

Therefore, in accordance with this invention an identification of the anomalies, the useful signals, only occurs from a comparison of the spectra of a multitude of measuring points on a profile across a deposit.

The pickup of primary signals preferably occurs by a group of at least three sensors simultaneously, however, it is also possible to combine individual chronologically offset recordings into a pseudo-array.

A correlation between the received measurement data and seismic data and the lithological parameters of the suspected collector also makes possible the determination of the volume or thickness of the examined deposit.

Thus the received measured data is compared with those from already known geologically analogous deposits.

This method of information-theoretical evaluation is known, for example as taught by German Patent DE 28 43 849 C3, and is used for evaluating the information obtained in accordance with this invention, wherein software, which was especially developed for this, is preferably employed.

Thus the method of this invention provides information regarding the type and location of the deposits, has considerable economic advantages and also ecological advantages in comparison with the known methods. The number of test drillings, which up to now was necessary, can be drastically reduced with this invention, which results in a considerable reduction of the costs required for an exploration. At the same time destruction of the environment is prevented to a large extent, which otherwise had to be accepted when sinking test bores.

BRIEF DESCRIPTION OF THE DRAWINGS

This invention will be explained in what follows by means of phases of a flow chart, making reference to schematic drawings, wherein.

DESCRIPTION OF PREFERRED EMBODIMENTS

Figure 1:
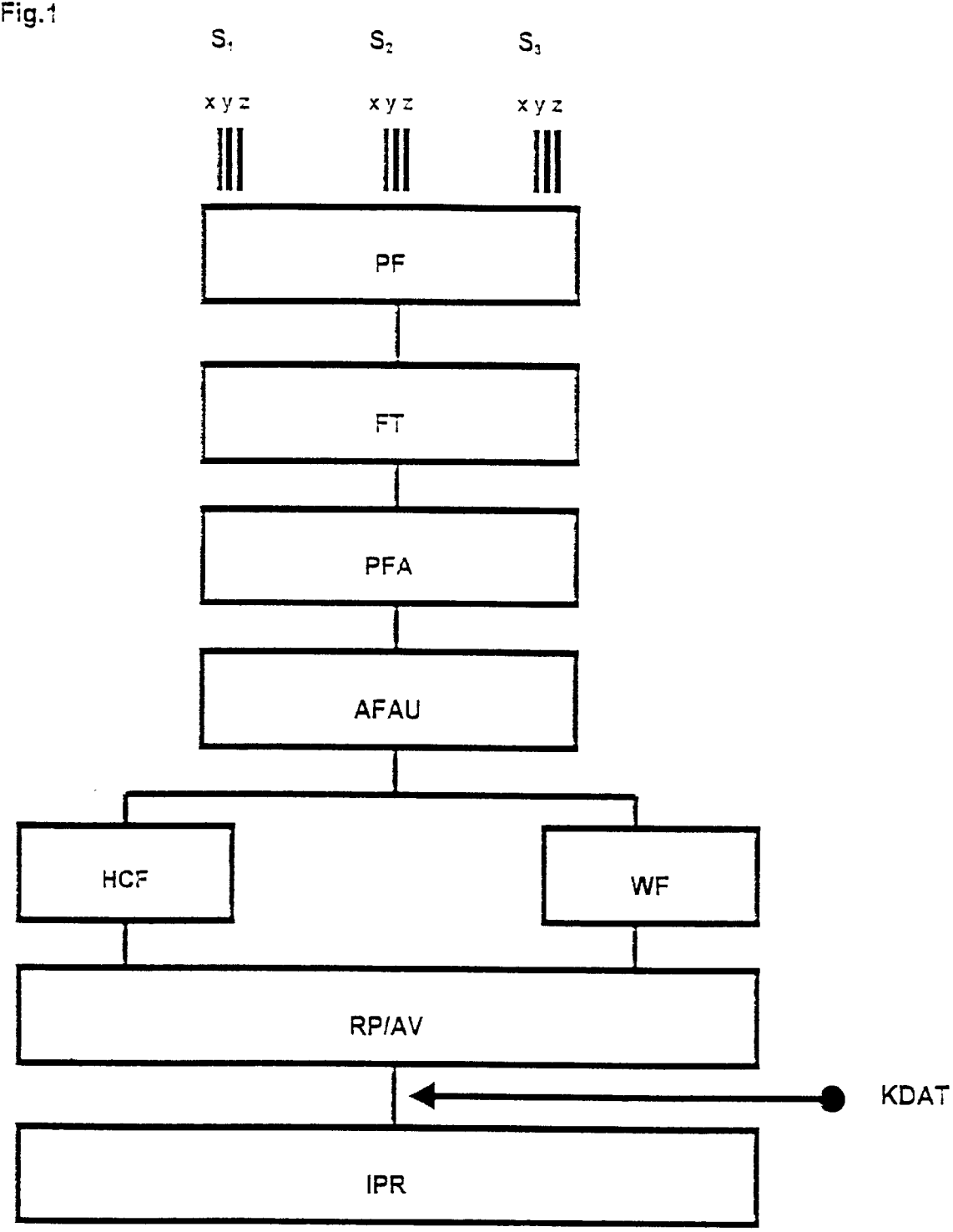
FIG. 1 is a representation of a processing of received measured data, wherein:
PF=Primary data filter
FT=Fourier transformation
PFA=Phase/frequency/amplitude comparison
AFAU=Amplitude/frequency evaluation
HCF=Hydrocarbon window
WF=Water window
RP/AV=Reservoir profile/amplitude ratio
KDAT=Correction data from known scenarios
IPR=Interpretation of the course of the reservoir.
Figure 2:
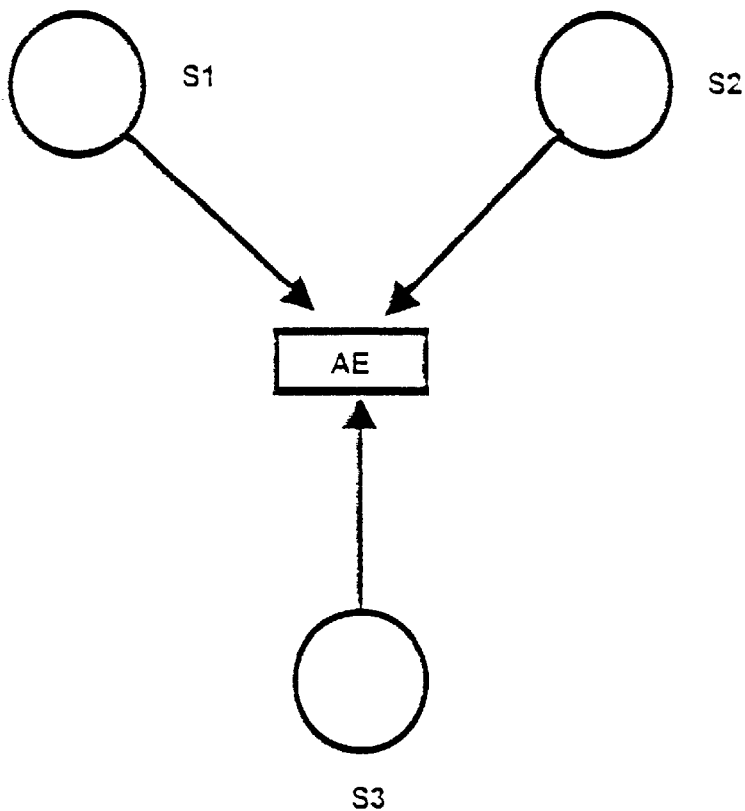
FIG. 2 is a schematic diagram of a measuring arrangement for detecting the primary measuring data for a measuring point, wherein:
S1, S2 and S3=Sensors
AE=Recording unit, such as a data recorder.

Phase 1: The measuring data are picked up by the sensors S1, S2, S3 by means of the arrangement shown in FIG. 2, and are recorded as digital information in the recorder AE. Recording takes place simultaneously for all sensors S1, S2, S3 and is separated into the components x, y, z.

The recording time is on the order of several minutes for each individual measurement.

Figure 3:
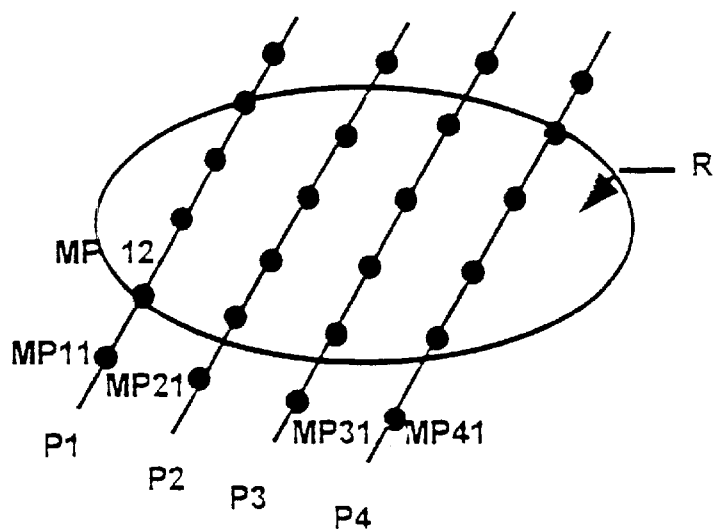
FIG. 3 shows a schematic diagram of a distribution of measuring points over a reservoir, wherein:
Pi=Measuring profiles
Mij=Measuring points
R=Reservoir.
Figure 4:
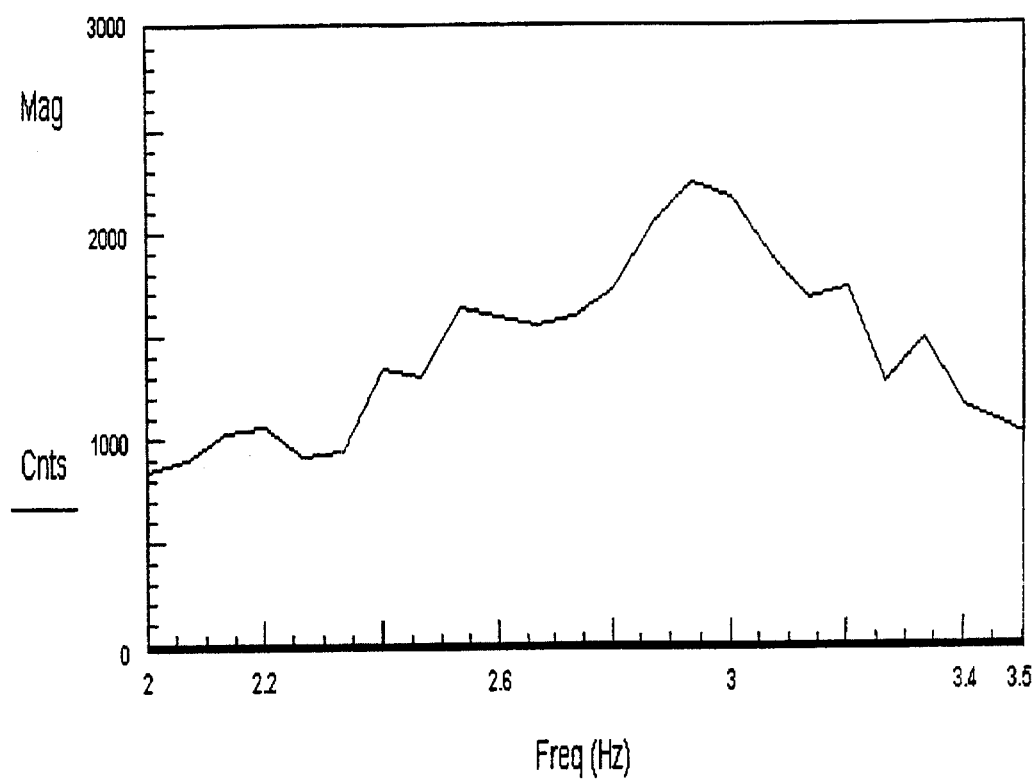
FIG. 4 shows a graphical representation of a typical frequency distribution of the correlated signal of the sensor group when hydrocarbon is present.
Figure 5:
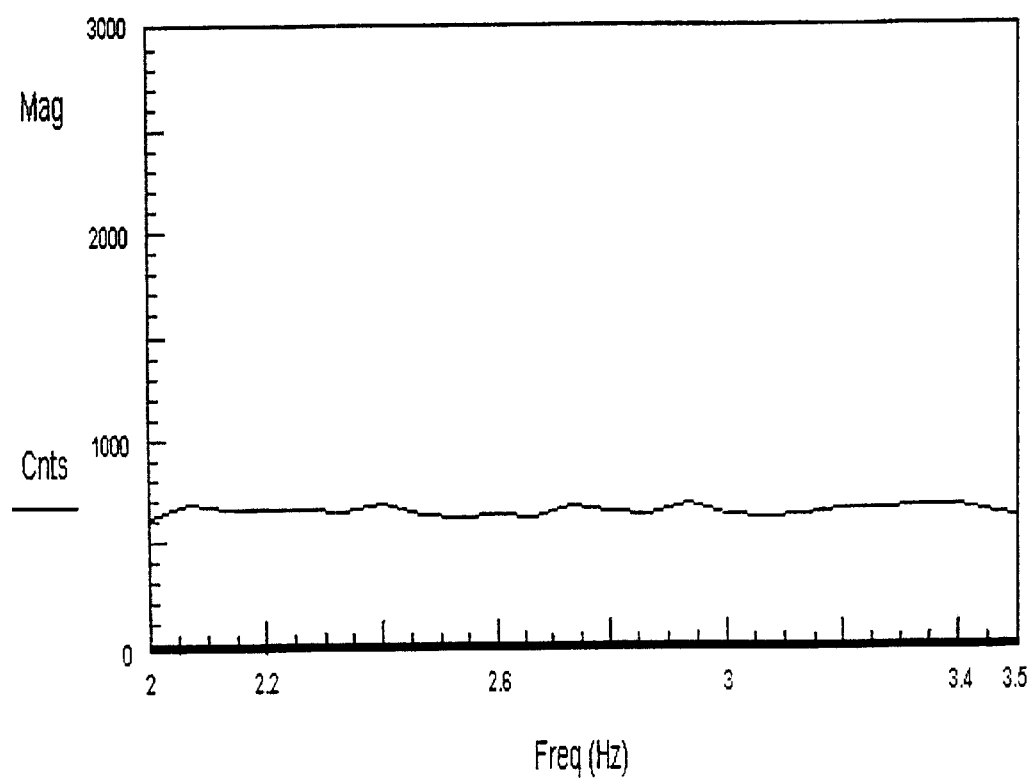
FIG. 5 shows a graphical representation of a typical frequency distribution of the correlated signal of the sensor group when hydrocarbon is not present.
Figure 6:
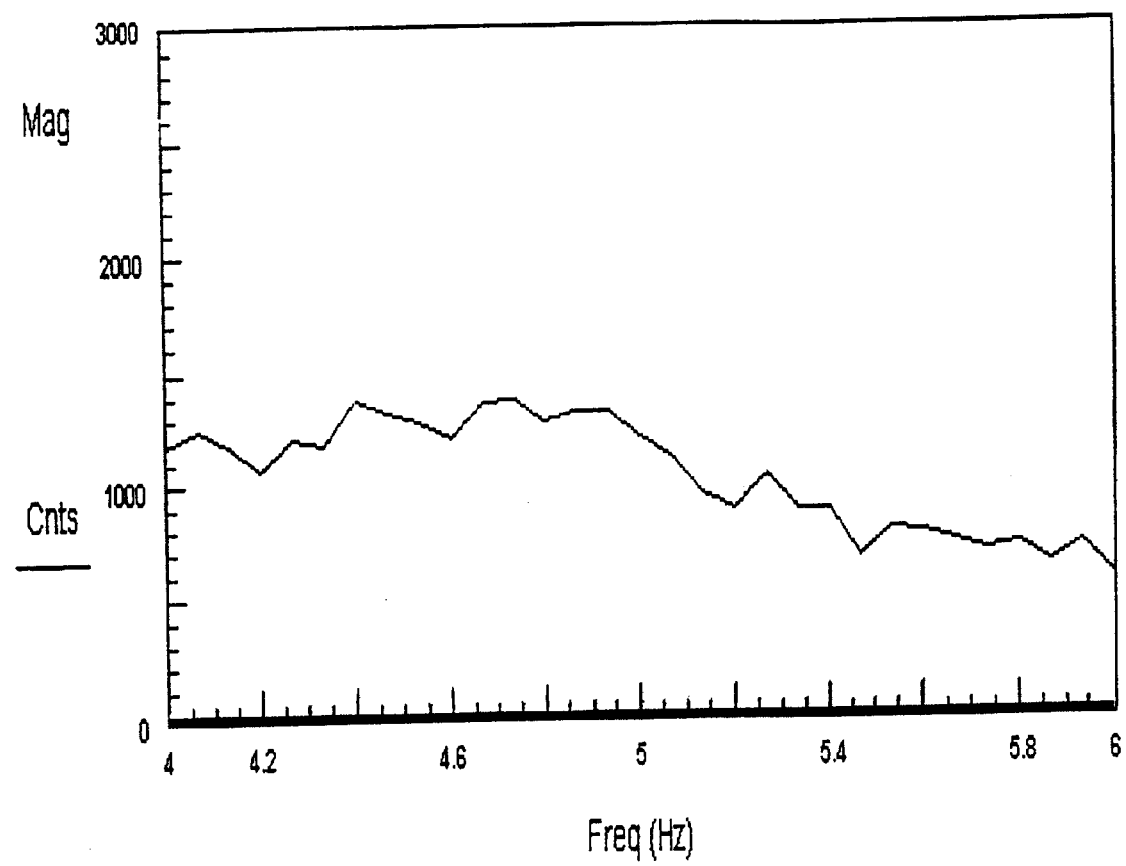
FIG. 6 shows a graphical representation of a typical frequency distribution when water is present.
Figure 7:
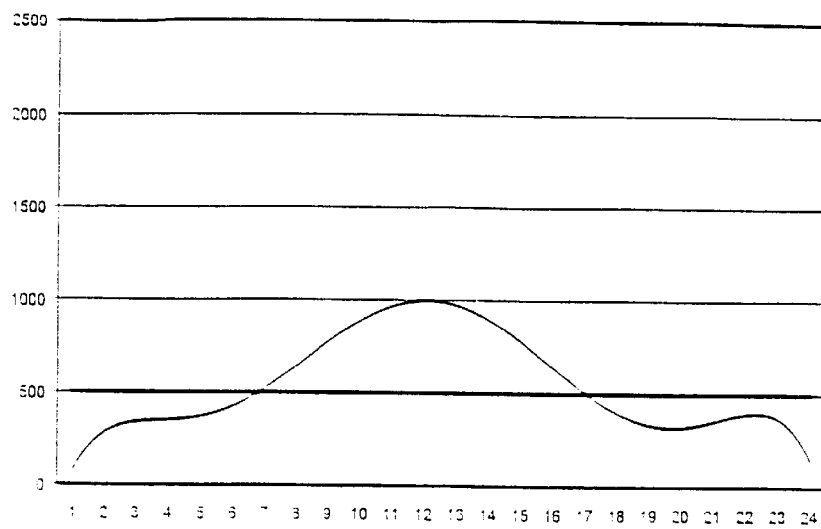
FIG. 7 is a graphical representation of a typical measuring profile across a deposit, showing amplitude values of the hydrocarbon window.
Figure 8:
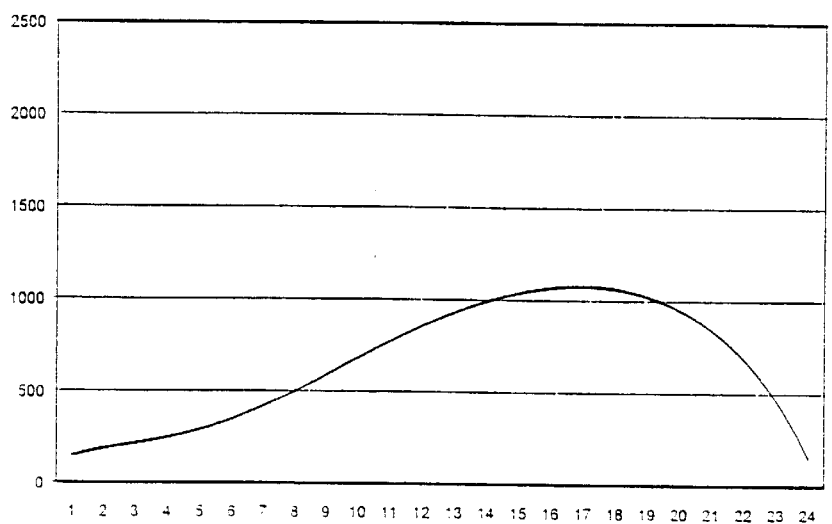
FIG. 8 is a graphical representation of a typical measuring profile across a deposit, showing amplitude values of the water window.
Figure 9:
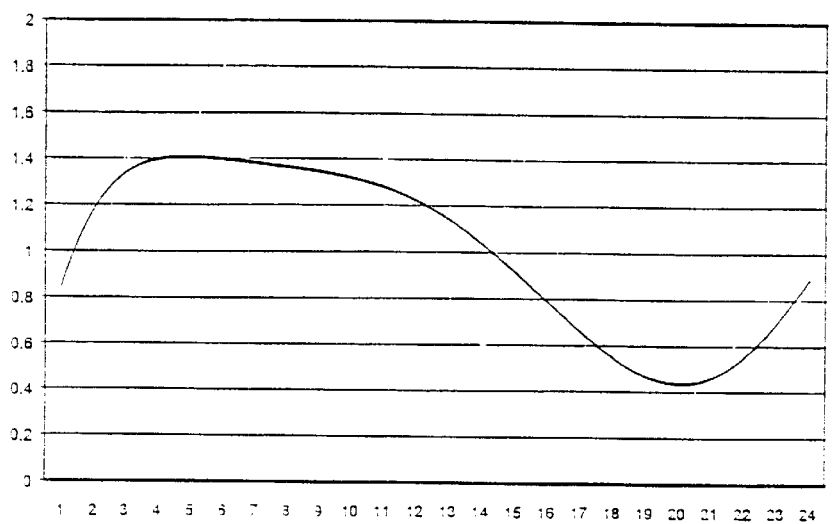
FIG. 9 is a graphical representation of a typical course of the ratio of the maxima from the hydrocarbon window and the water window.

In accordance with FIG. 3, the measurements take place at the measuring points Mij along the profiles Pi.

Phase 2: Following processing in a correlation filter (PF), the measured data or primary data are subjected to a frequency analysis (FT), and following the comparison of phase, frequency and amplitude (PFA), the frequency and amplitude values are determined from the correlated data and transferred to the appropriate windows, the hydrocarbon window (HCF) and the water window (WF).

Phase 3: A reservoir profile is produced from the received data, and the course of the amplitude ratio of the maxima from the separate frequency windows is determined.

Phase 4: These data are correlated with those from known scenarios, which makes possible an interpretation (IPR) of the geometry and the contents of the deposit.

It is advantageous but not necessary to perform the measurements in a second step with a multitude of sensors simultaneously over the entire deposit. However, this only makes sense if the presence of hydrocarbons and the borders of the deposit are already known.

In this case the totality of all measuring points Mij constitutes a sensor group which is equipped only with a three-dimensional sensor at each measuring point.

While performing the measurements themselves it makes sense for technical reasons to digitize the measured data in a known manner directly at the sensor (S) and to transmit them to the evaluation unit (AE) via a telemetry system. This is of particular advantage if the sensors (S) are not stationarily arranged.

In its application, the method of this invention is not limited to deposits in the interior of the earth, but can also be applied to any type of multiphase fluid systems in porous materials.

The method of this invention can be employed both on shore and off shore at any arbitrary water depths.

What is claimed is:

1. In a method for detecting and for identifying a type and geometric dimensions of hydrocarbon deposits and other underground fluid deposits, the improvement comprising: sensors measuring anomalies caused by a deposit in a natural earth frequency spectrum; filtering out and analyzing different frequencies in a range between 0.1 Hz and 10 Hz characteristic for the respective deposits; in at least two different frequency ranges separately evaluating amplitudes of maxima of the separately measured frequencies; placing into a correlation with each other amplitude values of the maxima and determining measuring points, according to $$B_i = \frac{AF1_i}{AF2_i} \geq 1$$

wherein AF1 is an amplitude maximum in a hydrocarbon window and AF2 is an amplitude maximum in a water window, each one for an i-th measuring point.

2. In the method in accordance with claim 1, wherein the measurements of the natural earth frequency spectrum are simultaneously performed with a plurality of three-dimensionally operating sensors.

3. In the method in accordance with claim 2, wherein a totality of all measuring points is combined into a pseudo group, and a selection of measuring profiles occurs only by a combination of several ones of the measuring points later in a course of evaluation.

4. In the method in accordance with claim 3, wherein the measuring profiles obtained as the result of measurements are correlated with at least one of known geo-physical information, geo-chemical information, geo-electrical information and geological information.

5. In the method in accordance with claim 4, wherein an additional excitation of a detected deposit occurs from an energy additionally supplied from an energy source.

6. In the method in accordance with claim 5, wherein a plurality of lost sensors are reactivated at any time after termination of a measurement.

7. In the method in accordance with claim 1, wherein a totality of all measuring points is combined into a pseudo group, and a selection of measuring profiles occurs only by a combination of several ones of the measuring points later in a course of evaluation.

8. In the method in accordance with claim 1, wherein the measuring profiles obtained as the result of measurements are correlated with at least one of known geo-physical information, geo-chemical information, geo-electrical information and geological information.

9. In the method in accordance with claim 1, wherein an additional excitation of a detected deposit occurs from an energy additionally supplied from an energy source.

10. In the method in accordance with claim 1, wherein a plurality of lost sensors are reactivated at any time after termination of a measurement.

* * * * *